(12) United States Patent
Frimpong-Ansah

(10) Patent No.: US 7,184,956 B2
(45) Date of Patent: Feb. 27, 2007

(54) METHOD OF AND SYSTEM FOR TRANSCRIBING DICTATIONS IN TEXT FILES AND FOR REVISING THE TEXT

(75) Inventor: Kwaku Frimpong-Ansah, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 883 days.

(21) Appl. No.: 10/281,694

(22) Filed: Oct. 28, 2002

(65) Prior Publication Data

US 2003/0083885 A1 May 1, 2003

(30) Foreign Application Priority Data

Oct. 31, 2001 (EP) ................................. 01890304

(51) Int. Cl.
*G01L 15/00* (2006.01)
*G01L 15/26* (2006.01)

(52) U.S. Cl. ...................................... 704/235
(58) Field of Classification Search ................. 704/235
See application file for complete search history.

(56) References Cited

U.S. PATENT DOCUMENTS

| 5,566,272 | A | * | 10/1996 | Brems et al. ............... 704/231 |
| 5,712,957 | A | | 1/1998 | Waibel et al. ................ 395/49 |
| 5,799,273 | A | * | 8/1998 | Mitchell et al. ............. 704/235 |
| 5,960,447 | A | * | 9/1999 | Holt et al. ................... 715/500 |
| 6,006,183 | A | * | 12/1999 | Lai et al. .................... 704/235 |
| 6,064,961 | A | | 5/2000 | Hanson ...................... 704/260 |
| 6,219,638 | B1 | * | 4/2001 | Padmanabhan et al. ...... 704/235 |
| 6,366,296 | B1 | * | 4/2002 | Boreczky et al. ........... 715/719 |
| 6,421,640 | B1 | * | 7/2002 | Dolfing et al. .............. 704/236 |
| 6,697,782 | B1 | * | 2/2004 | Iso-Sipila et al. ........... 704/275 |
| 6,792,409 | B2 | * | 9/2004 | Wutte ......................... 704/276 |
| 7,092,496 | B1 | * | 8/2006 | Maes et al. ............... 379/88.01 |
| 2002/0128833 | A1 | * | 9/2002 | Steinbiss .................... 704/235 |
| 2002/0178002 | A1 | * | 11/2002 | Boguraev et al. ........... 704/235 |

FOREIGN PATENT DOCUMENTS

EP 0651372 A2 5/1995
EP 0987683 A2 3/2000

OTHER PUBLICATIONS

A. Wendemuth, G. Rose, J.G.A. Dalting: Advances in Confidences Measures for Large Vocabulary; Int. Conf. on Acoustic Speech and Signal Processing 1999.
Kamppari et al: "word and phone level acoustic confidence scoring" ICASSP 1999, pp. 1799-1802.

* cited by examiner

*Primary Examiner*—Tālivaldis Ivars Šmits
*Assistant Examiner*—Eunice Ng

(57) ABSTRACT

The invention relates to a method and a transcription system (T) for transcribing dictations, in which a dictation file (5) is converted into a text file (8), and subsequently the text file (8) is compared with the dictation file (5). To increase the speed for the subsequent correction, provision is made that during transcription of the dictation file (5) a confidence value is generated for a transcribed text passage of the text file (8), and a comparison of the text file (8) with the dictation file (5) takes place only in respect of those text passages for which the confidence value of the text passage is below a confidence limit, i.e. a text passage recognized as possibly defective is present.

11 Claims, 4 Drawing Sheets

METHOD OF AND SYSTEM FOR TRANSCRIBING DICTATIONS IN TEXT FILES AND FOR REVISING THE TEXT

The invention relates to a method for transcribing dictations, in which a dictation file is converted into a text file.

The invention also relates to a transcription system for transcribing dictations with means for converting a dictation file into a text file.

Dictations which have been recorded in various ways are converted or transcribed into text files by transcription services. Normally, automatic speech recognition systems are used for the transcription of dictations. Since the texts obtained in this way always contain a certain percentage of errors or unsuitable text passages, the transcribed dictations have to be checked after conversion, and errors contained in the text file corrected. Normally, this correction is undertaken by means of a comparison of the text file with the dictation file by correction operatives, who play back the dictation file and check the text file in parallel with this. In the event of a defective or unsuitable transcription or text passage picked up by the correction operatives, the defective or unsuitable text passage is replaced with a different text passage. This correction work is extremely time-consuming, thereby considerably increasing the costs of the transcription. Since an error-free transcription will virtually never be achieved, this subsequent correction cannot be dispensed with. One of the aims, therefore, is to make the correction work following a transcription as rapid and efficient as possible.

In patent document U.S. Pat. No. 5,712,957, a method for the correction of transcribed dictations is disclosed in which the transcribed text and possible hypotheses, i.e. alternative text passages, are offered and evaluated in two different ways. The transcription result is supplied by combining the two evaluations. Although this method reduces the probability of error in a transcribed text, it still makes a subsequent, time-consuming check by a correction operative necessary.

Patent document U.S. Pat. No. 6,064,961 discloses a method for showing a transcribed text in a window for checking, in which the text section currently under review is always shown in a defined, centralized position in the window. This facilitates the proofreading of the transcribed text, accelerating it slightly at best.

It is an object of the invention to accelerate a method for the transcription of dictations by improving the time-consuming correction method, so that the transcription result, i.e. the finished text, can be delivered to the author of the dictation as rapidly as possible. It should also be possible to reduce the costs of transcription.

A further object of the invention consists in the creation of a transcription system for the transcription of dictations, which enables the fastest, most efficient transcription possible, so that the finished text can arrive with the author of the dictation as rapidly and as error-free as possible.

The object according to the invention is achieved in respect of the method in that for the converted or transcribed text passages information concerning their reliability is generated and a confidence value is generated for the relevant text passage, and a comparison of the text file with the dictation file takes place only in the case of text passages for which the confidence value is below a confidence limit, i.e. where text passages recognized as possibly defective are present. With the proviso of as good a determination of the confidence value as possible for the transcribed text passages, enormous time savings can be made with this method when correcting the transcribed text. Experience has shown that, when the method according to the invention is applied, only 10%–20% of a dictation has to be listened to by a correction operative.

It is additionally advantageous if the text passages recognized as possibly defective are marked. This can be done by, for example, underlining the text passages in question or by color marking to highlight them.

It is preferable for the dictation file to be converted into a text file automatically using a speech recognition device.

According to a further feature of the invention, provision is made that during a correction procedure the playback speed for a dictation is altered depending on the confidence value of the relevant transcribed text passage when the text file is compared with the dictation file. Here, dependency may be multi-stage in accordance with the marking of the text passage recognized as possibly defective. For example, in the case of a text passage recognized as very probably defective, the playback speed is considerably reduced, whereas it is increased in the case of a text passage recognized as less probably defective. In the case of defect-free text passages, the playback speed for a dictation can be increased to a stipulated maximum value. For example, the playback speed may be varied between 50% and 200% of a normal playback speed.

If the confidence limit can be advantageously set, it is possible to achieve a further increase in efficiency.

To improve the end result, it is possible to repeat the comparison of the text file with the dictation file using an increased confidence limit, so that only text passages with a high error probability are recognized, and a correction is undertaken only for these errors. Although the overall time for the transcription is increased by a second comparison procedure, this can be very advantageous, or even prescribed, for certain applications.

The object according to the invention is also achieved by a transcription system for transcribing dictations, comprising conversion means for converting a dictation file into a text file with text passages, and comprising file comparison means for comparing the text file with the dictation file, and comprising confidence-value generation means by which a confidence value can be generated for each converted text passage, and comprising comparison means for comparing the confidence value with a confidence limit, in which the file comparison means undertake the comparison of the text file with the dictation file only in the case of text passages for which the confidence value is below a confidence limit, i.e. where text passages recognized as possibly defective are present.

Hereby, marking means for marking the text passages recognized as possibly defective are advantageously provided. This marking may take place as a function of a confidence value which is assigned to a recognized text passage during the transcription. A marking can be used e.g. to highlight the text passage recognized as possibly defective for which the confidence value is below a confidence limit.

The means for converting the dictation file into a text file are advantageously in the form of a speech recognition device.

For one embodiment of the invention, a device for changing the playback speed for a dictation file as a function of text-file passages recognized as possibly defective can be provided. The changing of the playback speed can take place between two fixed values or between several values as a function of the result of the comparison of the confidence value of the particular transcribed text passage with the confidence limit.

Means for inputting the confidence limit and thereby for changing it are advantageously provided, with which means a matching of the confidence value for the particular text passage to the particular requirements or according to the experience of a correction operative can also take place. Furthermore, a further correction run with a changed confidence limit can be provided.

To facilitate final correction for the author of a dictation, means may be provided for weighting the text passages recognized as possibly defective in the transcribed text in which possible errors or inconsistencies have been found. These means may also be used by the author of the dictation for the final correction in order to indicate to the correction operative which text passages remained defective even after the correction, as a result of which information important to the transcription process can be gathered.

The invention will be further described with reference to examples of embodiment shown in the drawings to which, however, the invention is not restricted.

Figure 1:
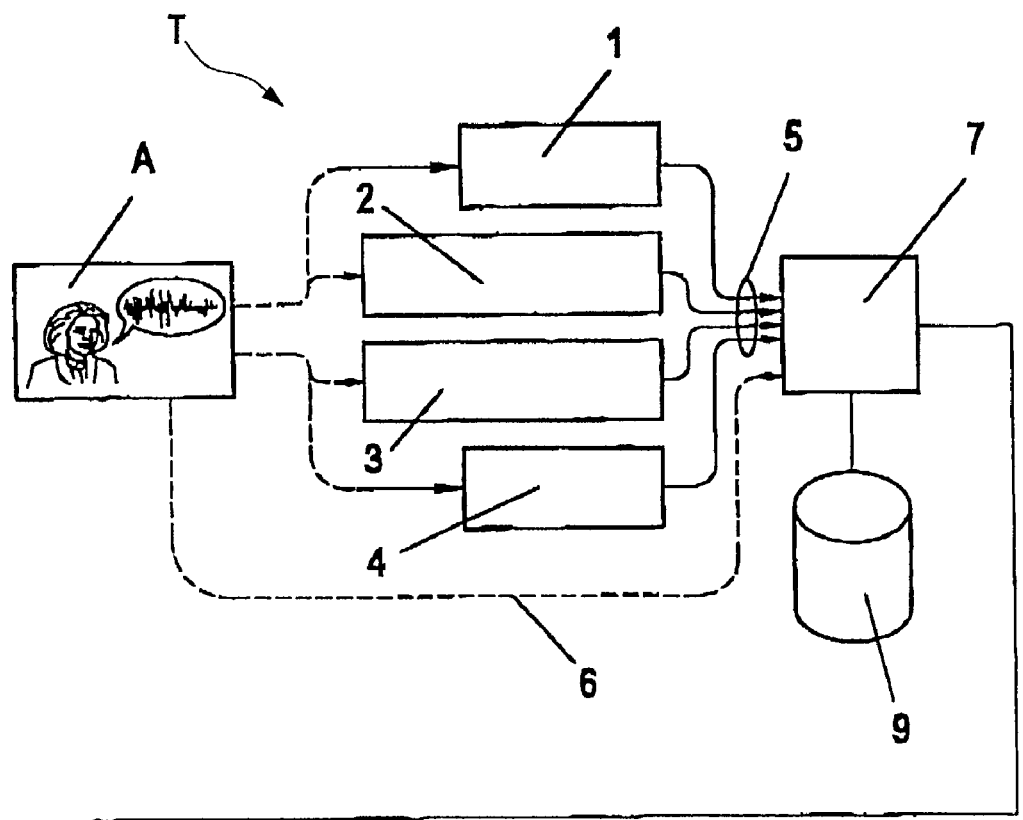
FIG. 1 shows a block diagram of a conventional transcription system.
Figure 1:
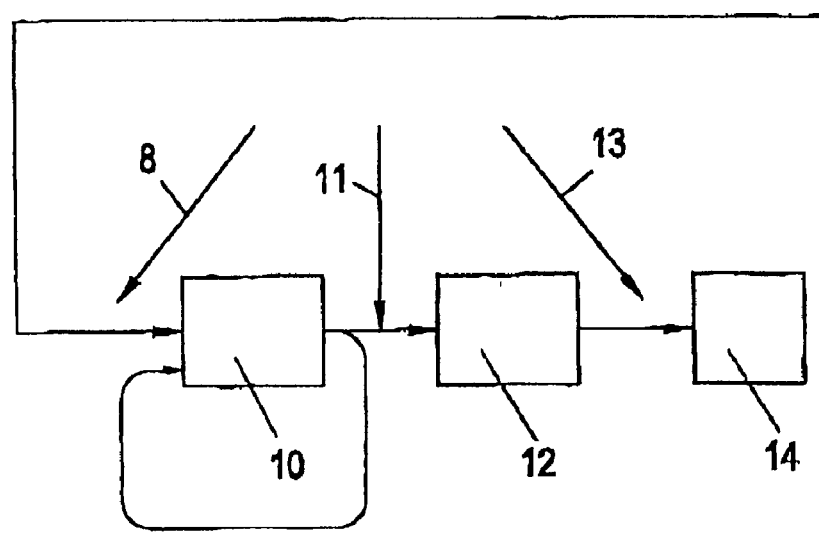

FIG. 1 shows schematically a block diagram of a transcription system T, with which an author A creates a dictation which is stored either in a dictation device 1 or in a personal computer 2 or in a portable computer 3. It is also possible for author A to dictate into a telephone 4, after which the dictation is stored in, for example, a central computer. The dictation device 1 supplies a dictation file 5, which contains a digitized speech signal. A suitable format for such a file, which contains a digitized speech signal, is a WAV file, for instance. Likewise, the personal computer 2 or the portable computer 3, or a central computer addressed via telephone 4 supplies the corresponding dictation file 5 which contains the digital speech signal. The dictation file 5 or a speech signal 6 is normally fed to a speech recognition device 7 in which an automatic conversion of dictation file 5 or of speech signal 6 into a text file 8 takes place. For the speech recognition, the speech recognition device 7 accesses an information database 9 in which a multiplicity of possible words that could be recognized are contained. Hereby, account can be taken of, for instance, a voice profile and a sentence structure for certain application areas (e.g. from the field of medicine). Naturally, the text file 8 contains a certain number of defective or unsuitable text passages which subsequently have to be corrected. To this end, text file 8 is transferred to file comparison means 10 provided for the purpose, which file comparison means may also be referred to in the following as a correction device. In correction device 10, text file 8 is compared with dictation file 5, this normally being done by a correction operative, whereby the acoustic signal of author A is played back or reproduced, and compared with the text from text file 8 shown on a screen or on another display device. This correction process naturally requires a particularly large amount of time, and accounts for a large proportion of the total processing time. The correction process is often repeated at least once more.

Figure 3:
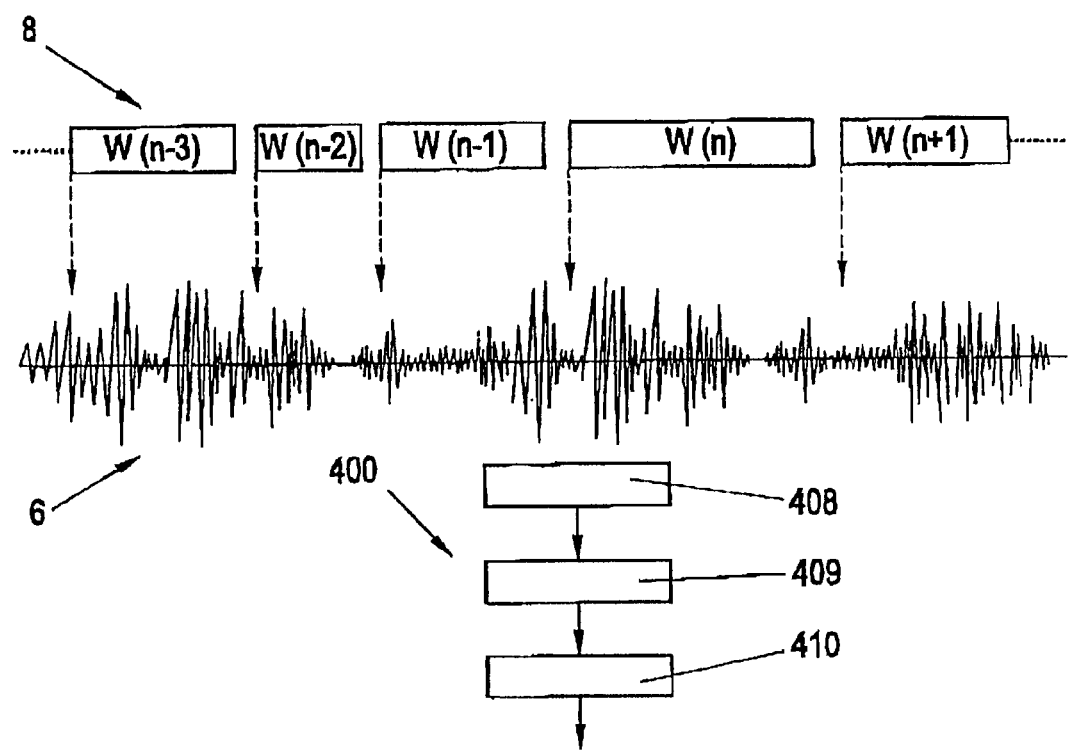
FIG. 3 shows a flowchart of a conventional method for correcting a transcribed text.

FIG. 3 shows a flowchart 400 of a conventional procedural sequence for correcting a transcribed text. Above a section of the speech signal 6 of dictation file 5 are five text passages W(n−3), W(n−2), W(n−1), W(n) and W(n+1) of text file 8. In accordance with a block 408 of flowchart 400, the start of speech signal 6 or of dictation file 5 is sought, and the playback of dictation file 5 or of speech signal 6 and a synchronous representation of text file 8, e.g. on a screen, starts up. In accordance with block 409, to assist the orientation of the correction operative, a cursor or similar is carried along in the text of text file 8 according to the position in speech signal 6, or the current position in the text is shown by corresponding marking of the relevant text passage W(n) and, at most, of the preceding text passage W(n+1) and subsequent text passage W(n−1). In accordance with a block 410, the current text passages are highlighted e.g. by underlining or by changing the color of the text passages. The correction operative reads the displayed text of text file 8 and simultaneously listens to the speech signal 6, and corrects text passages which, in his estimation, are defective or unsuitable. Correction takes place e.g. by overwriting a text passage marked as defective W(n) with a correct or more suitable text or section of text.

Following the correction process, a corrected text 11 can be fed to a device 12 for quality control. This quality control stage is normally also undertaken by a correction operative, who compares the dictation file 5 with the corrected text 11. Finally, in accordance with a block 14 in FIG. 1, a checked text file 13 is sent to the author A for perusal. This is done, for example, by sending the corrected, checked text file 13 via email. Once the author A has checked the text, he sends a message to this effect to the transcription location, whereupon the transcription is concluded, e.g. by issuing of the invoice.

It is important in transcription processes of this kind to minimize the time span between the recording of a dictation by the author A and the receipt of the finished text by the author A in accordance with block 14. In automatic speech recognition systems, a large proportion of this time span is taken up by the correction and any quality control. It is therefore a prime objective to reduce this time span and thereby to shorten considerably the overall transcription process and, as a result, to keep the costs of the transcription low.

Figure 6:
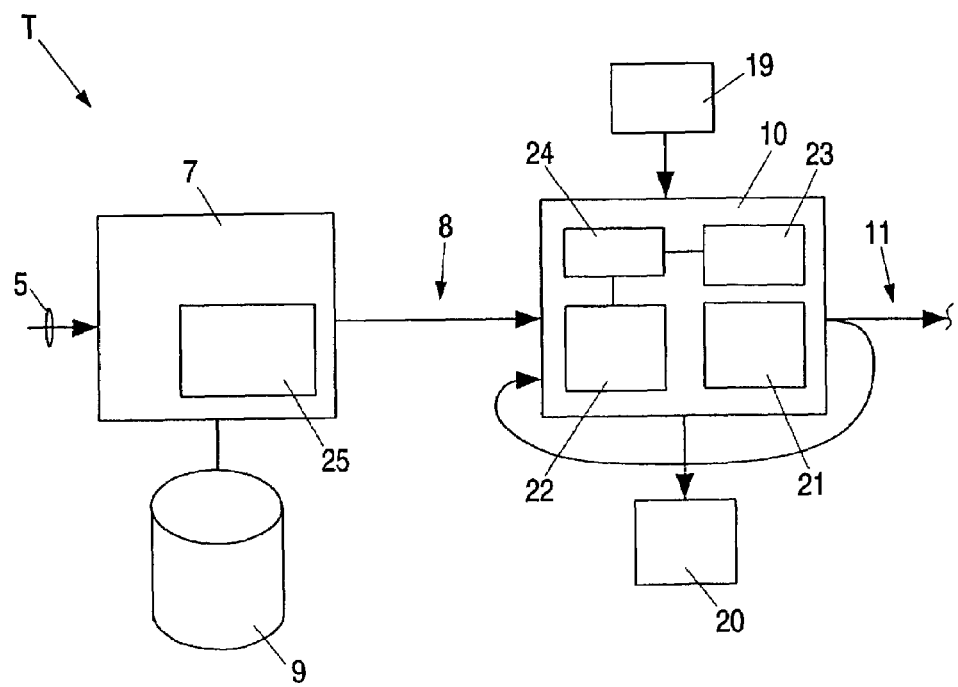
FIG. 6 shows a block diagram of a part of a transcription system according to the invention.

FIG. 6 shows a block diagram of a part of a transcription system T that is important for the invention. The dictation file 5 is transferred to the speech recognition device 7 and converted into a text file 8, as already described in connection with FIG. 1. The speech recognition device 7 is equipped with confidence-value generation means 25, which is designed to generate a confidence value for a converted text passage W(n). The generation of confidence values of this kind is known in expert circles and is dealt with in, for example, A. Wendemuth, G. Rose, J. G. A. Dalting: Advances in Confidence Measures for Large Vocabulary; Int. Conf. on Acoustic Speech and Signal Processing 1999.

By virtue of the reference to this document, the disclosure contained therein is deemed as being included here too. The confidence values supplied by the confidence-value generation means 25 may be within a confidence-value range from zero (0) to one thousand (1,000), whereby a confidence value of one thousand (1,000) means that the text passage W(n) has been correctly recognized or transcribed with 99.99% reliability. It can be mentioned here that the confidence value can equally be represented by a different range of figures, e.g. from zero (0) to one hundred (100).

The text file 8 produced is sent from the speech recognition device 7 to the downstream correction device 10, which is designed to display the text file 8 and play back dictation file 5, and to recognize and mark possibly defective text passages W(n). Connected to the correction device 10 are a display device 20, which is designed to display text file 8, and inputting means 19, which is also designed for manually altering a confidence value. The correction device 10 is equipped with weighting means 21, which is provided and designed for manually weighting the text passages W(n) of text file 8. The correction device 10 is also equipped with a device 22, which is designed for altering a playback speed of text passages W(n) of text file 8. Also contained in correction device 10 are marking means 23, which are designed for marking the text passages W(n), and comparison means 24, which are designed for comparing the confidence value with a confidence limit.

Figure 2:
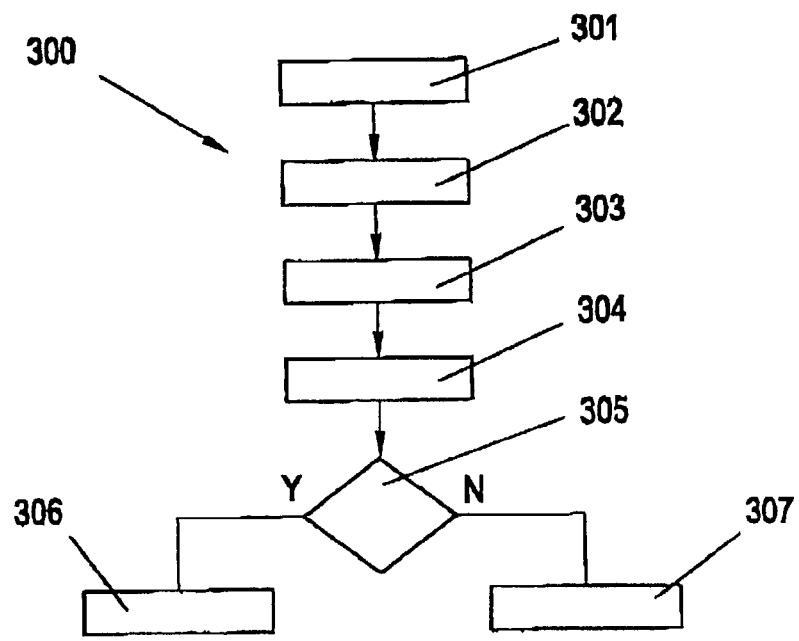
FIG. 2 shows a flowchart which is followed when correcting a text file with text passages recognized as possibly defective.

FIG. 2 shows a flowchart 300 of a process which runs in correction device 10 of transcription system T according to the invention. In accordance with a block 301, the dictation file, e.g. a WAV file, is opened, and the confidence value or confidence information is reproduced in accordance with a block 302 in the display device 20, which may be, for instance, a screen. The confidence information is represented, or the text passages are marked, in accordance with FIG. 6, in the marking means 23, and this may happen in various ways, e.g. by altering the color of the text displayed on the screen, i.e. by coloring the text passage W(n) according to the associated confidence value, or by coloring the background of the text passage W(n) according to the associated confidence value. Here, the color representation of the text passage W(n) can, for example, be determined from a linear color profile, from a color red for a minimum confidence value to a color green for a maximum confidence value. It can be mentioned that the marking of the text passage W(n) may also take place indirectly in that the color representation of all other text passages is changed as compared with the text passage to be marked W(n). In accordance with a block 303, a confidence limit $C_G$ is selected by the user or the correction operative, and in accordance with block 304, the text is checked for possible errors. The confidence limit $C_G$ may lie, for example, at 80% or 90% of a maximum confidence-value range. Accordingly, for each text passage W(n), an inquiry takes place at a block 305 as to whether the confidence value difference C(n) is smaller, equal to or greater than the confidence limit $C_G$. In the event that the confidence limit $C_G$ is exceeded, then in accordance with a block 306, no marking is undertaken of the selected text passage W(n) as possibly defective. If the confidence limit $C_G$ is undershot or equaled, the corresponding text passage W(n) is marked as possibly defective. Using the defects in text file 8 recognized in accordance with flowchart 300, a more efficient, considerably more rapid correction of the transcribed text or text file 8 can take place. The correction takes place in such a way that, when the text file 8 is compared with the dictation file 5 during the correction sequence, a jump takes place only to the text passages recognized as possibly defective, and only the text passages recognized as possibly defective have to be corrected by the correction operative. A considerable amount of time can be saved in this way, since the correction operative does not have to listen to the complete dictation file 5. The correction sequence can, for example, take place in such a way that the playback speed for the dictation or the dictation file 5 is altered as a function of the text passages recognized as possibly defective, whereby the playback speed is increased to, for instance, twice its value in the case of text passages not marked as possibly defective, whereas the playback speed is reduced when playing back possibly defective text passages.

Figure 4:
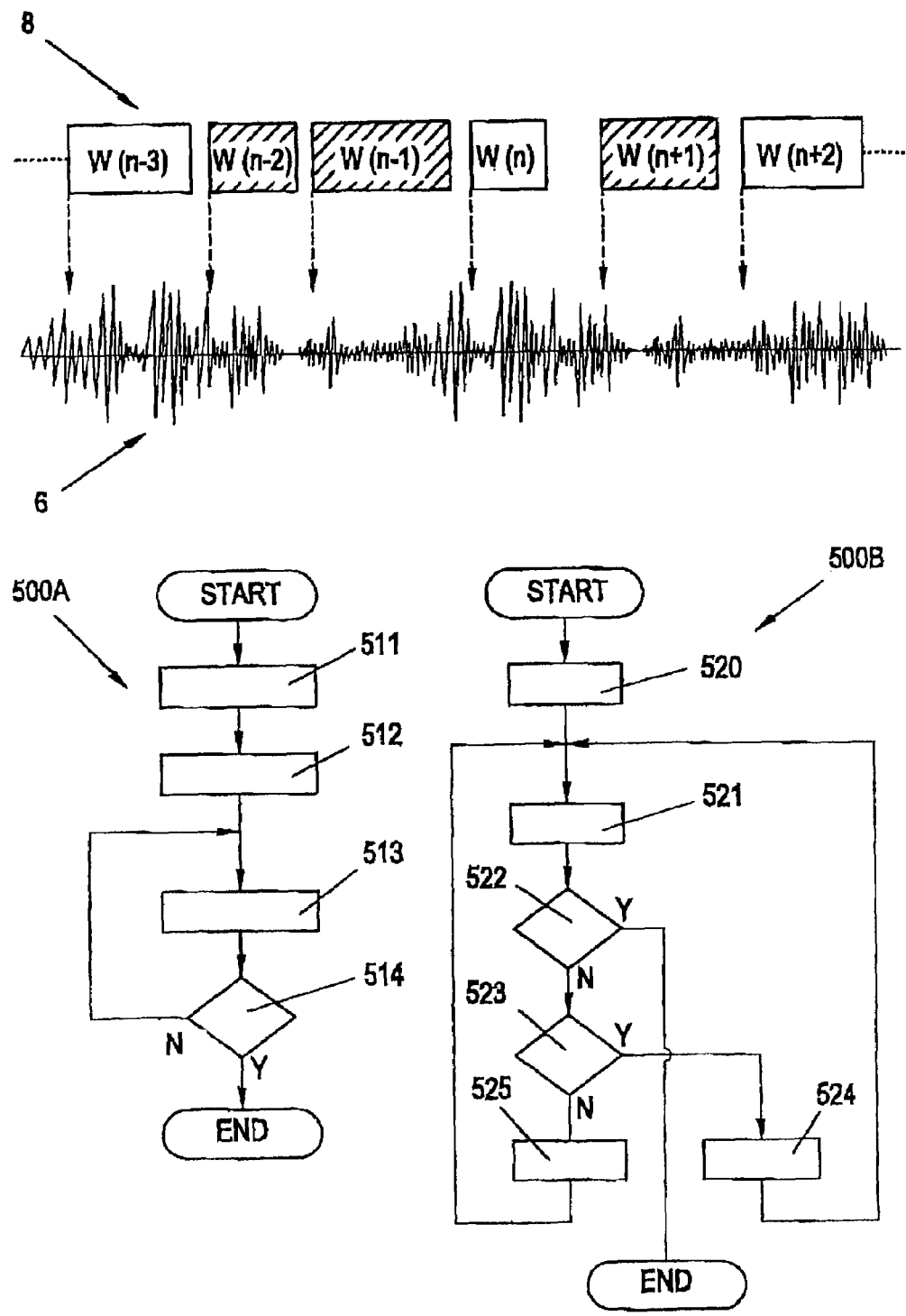
FIG. 4 shows two variants of a method according to the invention for correcting a transcribed text.

FIG. 4 shows flowcharts 500A and 500B of two variants of the method according to the invention. A sequence of six successive text passages W(n−3) to W(n+2) is again shown schematically above the speech signal 6. In the example shown, three text passages, namely W(n−2), W(n−1) and W(n+1) have been recognized as possibly defective and marked accordingly, as shown by the hatching.

In accordance with the flowchart 500A, according to a block 511, the text file 8 and, in parallel, the dictation file 5 or the speech signal 6 is opened and played back, and, according to a block 512, the transcribed text is shown on the display device 20, which may be a monitor. According to a block 513, those text passages which have been classified as not defective are skipped during playback of the speech signal 6 or the dictation file 5, and a jump takes place to the start of the next text passage marked as defective W(n), with playback taking place from there to a next, successive text passage marked as not defective. According to a block 514, a check is made as to whether the end of dictation file 5 or the text file 8 has been reached, whereby, if the result of this decision question is negative, continuation takes place at block 513, and, if the result is positive, the sequence is terminated.

In accordance with flowchart 500B, firstly, according to a block 520, the speech signal 6 or the dictation file 5 and, synchronously with this, the associated text file 8 are started and, according to a block 521, the playback of the speech signal 6 or dictation file 5 is started. According to a block 522, a check is made as to whether the end of text file 8 or dictation file 5 has been reached, whereby, in the case of a positive result, the sequence is terminated. Otherwise, in the case of a negative result to the check at block 522, a check is made at a block 523 as to whether the text passage W(n) has been marked as defective, whereby, in the case of a positive result, the sequence is continued at a block 524 or, otherwise, a jump to a block 525 is made. The playback speed for playing back the speech signal 6 and representing text file 8 is altered according to both block 524 and block 525. For example, according to block 525, the playback speed for the text passages marked as not defective W(n−3), W(n) and W(n+2) can be twice as fast as the normal playback speed and, according to block 524, the playback speed for the text passages recognized as possibly defective and marked accordingly W(n−2), W(n−1) and W(n+1) can be selected to be half as fast as the normal playback speed.

Figure 5:
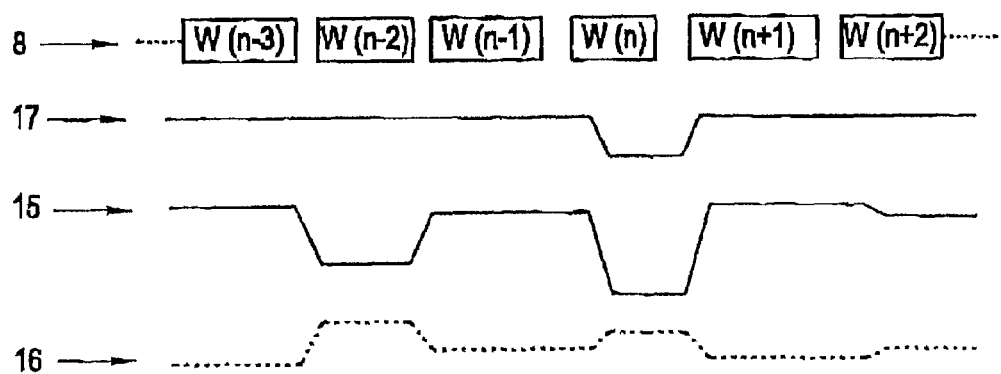
FIG. 5 shows schematically a method for changing a confidence limit in a method according to the invention.

FIG. 5 shows schematically a method with which the confidence values are altered manually. One part of a text file 8 is again shown in the form of six successive text passages W(n−3) to W(n+2), and the profile of the automatically produced confidence values is sketched in a profile 15. According to the profile 15, the text passages W(n−2), W(n) and W(n+2) have a lower confidence value than the remaining text passages. If the correction operative now manually makes a contribution to the confidence values according to a profile 16, a correction of the confidence-value profile can take place. For example, the correction operative can, during the playing of text file 8, record with the input means 19, which may be, for instance, a keyboard, that the text passages W(n−2) and W(n) and W(n+2) are probably defective. In accordance with a profile 17, by combining an automatically determined confidence-value profile 15 and the manual confidence-value contribution 16, a resultant confidence-value profile is generated and, as a result, only the text passage W(n) is classified as possibly defective. Through a contribution by experienced correction operatives, a considerable reduction in the number of text passages recognized or classified as possibly defective can thereby be achieved, saving time on the subsequent correction.

The method or system according to the invention for transcribing dictations can be used both in the conventional correction of a transcribed text and in the quality control of the transcribed text. Experience has shown that savings of up to 90% in correction time are achievable compared with conventional correction methods in which the entire dictation has to be listened to.

The invention claimed is:

1. A method for transcribing dictations comprising the steps of:
    converting a dictation file (5) into a text file (8) with text passages (W(n)),
    generating a respective confidence value during the conversion to converted text passages (W(n)),
    comparing the text file (8) with the dictation file (5) only in the case of those text passages (W(n)) for which the confidence value is below a confidence limit ($C_G$), i.e. where possibly defective text passages (W(n)) are present; and
    altering a playback speed for the dictation file (5) during comparison of the text file (8) with the dictation file (5) as a function of the confidence value of the relevant text passage (W(n)).

2. The method as claimed in claim 1, further comprising the step of:
    marking the text passages (W(n)) for which the confidence value is below a confidence limit ($C_G$).

3. A method as claimed in claim 1, in which the dictation file (5) is converted into a text file (8) automatically using a speech recognition device (7).

4. The method as claimed in claim 1, further comprising the step of:
    equipping the text passages (W(n)) for which the confidence value is below the confidence limit ($C_G$) with a weighting factor.

5. The method as claimed in claim 1, wherein the confidence limit ($C_G$) is adjustable.

6. The method as claimed in claim 1, further comprising the step of:
    repeating the comparison of the text file (8) with the dictation file (5) with an increased confidence limit ($C_G$).

7. A transcription system (T) for transcribing dictations comprising
    conversion means (7) for converting a dictation file (5) into a text file (8) with text passages (W(n));
    confidence-value generation means (25) by which a confidence value is generated for each converted text passage (W(n)),
    comparison means (24) for comparing the confidence value with a confidence limit ($C_G$) only in the case of those text passages (Wn)) for which the confidence value is below a confidence limit ($C_G$) ; and
    playback speed alteration means for altering the playback speed for the dictation file (5) during comparison of the text file (8) with the dictation file (5) as a function of the confidence value of the relevant text passage (W(n)).

8. The transcription system (T) as claimed in claim 7, further comprising:
    means (23) for marking the text passages (W(n)) for which the confidence value is below the confidence limit ($C_G$).

9. The transcription system (T) as claimed in claim 7, in which the conversion means (7) for converting the dictation file (5) into a text file (8) is in the form of a speech recognition device.

10. The transcription system (T) as claimed in claim 7, further comprising:
    means (21) are provided for weighing the text passages (W(n)) of the text file (8).

11. The transcription system (T) as claimed in claim 7, further comprising:
    means (19) are provided for inputting the confidence limit ($C_G$).

* * * * *